US010711451B2

(12) United States Patent
Bedel

(10) Patent No.: US 10,711,451 B2
(45) Date of Patent: Jul. 14, 2020

(54) RACK CONSTRUCTION ASSEMBLY

(71) Applicant: Maurice Bedel, Greensburg, IN (US)

(72) Inventor: Maurice Bedel, Greensburg, IN (US)

( * ) Notice: Subject to any disclaimer, the term of this patent is extended or adjusted under 35 U.S.C. 154(b) by 313 days.

(21) Appl. No.: 15/803,245

(22) Filed: Nov. 3, 2017

(65) Prior Publication Data

US 2019/0136505 A1 May 9, 2019

(51) Int. Cl.
*E04B 1/26* (2006.01)
*E04G 1/10* (2006.01)

(52) U.S. Cl.
CPC .............. *E04B 1/2604* (2013.01); *E04G 1/10* (2013.01); *B65D 2519/00238* (2013.01); *E04B 2001/2644* (2013.01); *Y10T 403/341* (2015.01)

(58) Field of Classification Search
CPC ......... B65D 2519/00238; E04B 1/2604; E04B 2001/2644; E04B 2001/266; E04G 1/08; E04G 1/10; E04G 5/045; E04G 5/06; E04G 7/14; E04G 2005/068; F16B 7/0493; F16B 7/185; F16B 12/14; F16B 12/16; F16B 12/46; F16B 12/48; F16B 2012/145; Y10T 403/341; Y10T 403/42; Y10T 403/44; Y10T 403/443; Y10T 403/7141; Y10T 403/7194; Y10T 403/73
USPC ........ 403/170, 205, 217, 218, 391, 400, 403
See application file for complete search history.

(56) References Cited

U.S. PATENT DOCUMENTS

| | | | |
|---|---|---|---|
| 2,879,087 A * | 3/1959 | Haglund | F16B 7/18 403/169 |
| 2,895,186 A * | 7/1959 | Franks | B65D 9/34 403/172 |
| 3,386,590 A * | 6/1968 | Gretz | F21V 35/00 211/189 |
| 3,462,021 A * | 8/1969 | Hawke | A47F 5/14 211/182 |
| 3,740,084 A * | 6/1973 | Tellberg | B63C 15/00 403/171 |
| D235,728 S | 7/1975 | Parziale | |
| 4,066,371 A * | 1/1978 | Chapman | F16B 7/0493 248/431 |
| 4,355,725 A | 10/1982 | Humphrey | |
| 4,449,842 A | 5/1984 | Reichman, Jr. | |
| 4,616,757 A * | 10/1986 | Hobson | B27B 17/0041 211/189 |
| 4,685,576 A | 8/1987 | Hobson | |
| 4,885,883 A * | 12/1989 | Wright | E04B 1/2604 52/280 |
| 4,910,939 A * | 3/1990 | Cavanagh | E04B 1/2604 403/171 |
| 5,651,467 A | 7/1997 | Moran, III | |
| 6,004,063 A | 12/1999 | Adams, Sr. | |

(Continued)

FOREIGN PATENT DOCUMENTS

DE 3101900 A1 * 9/1982 ........... E04B 1/2604

*Primary Examiner* — Josh Skroupa

(57) ABSTRACT

A rack construction assembly for building a storage rack includes a plurality of bracket units. Each of the bracket units has a plurality of channels therein to insertably receive dimensional lumber. Thus, the dimensional lumber is arranged to form a rack for storing objects. Each of the channels corresponding to each of the bracket units is oriented at right angles with respect to each other. Thus, the dimensional lumber corresponding to each of the channels defines an X axis, a Y axis and a Z axis of the rack.

13 Claims, 4 Drawing Sheets

(56) References Cited

U.S. PATENT DOCUMENTS

| | | | |
|---|---|---|---|
| 6,786,302 B2 * | 9/2004 | Liew | E04G 7/14 |
| | | | 182/186.8 |
| 6,997,332 B1 | 2/2006 | Alexander et al. | |
| 7,021,424 B2 * | 4/2006 | Herman | B25H 1/06 |
| | | | 182/224 |
| 7,654,036 B2 | 2/2010 | Shouse et al. | |

* cited by examiner

RACK CONSTRUCTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to construction devices and more particularly pertains to a new construction device for building a storage rack.

BRIEF SUMMARY OF THE INVENTION

An embodiment of the disclosure meets the needs presented above by generally comprising a plurality of bracket units. Each of the bracket units has a plurality of channels therein to insertably receive dimensional lumber. Thus, the dimensional lumber is arranged to form a rack for storing objects. Each of the channels corresponding to each of the bracket units is oriented at right angles with respect to each other. Thus, the dimensional lumber corresponding to each of the channels defines an X axis, a Y axis and a Z axis of the rack.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
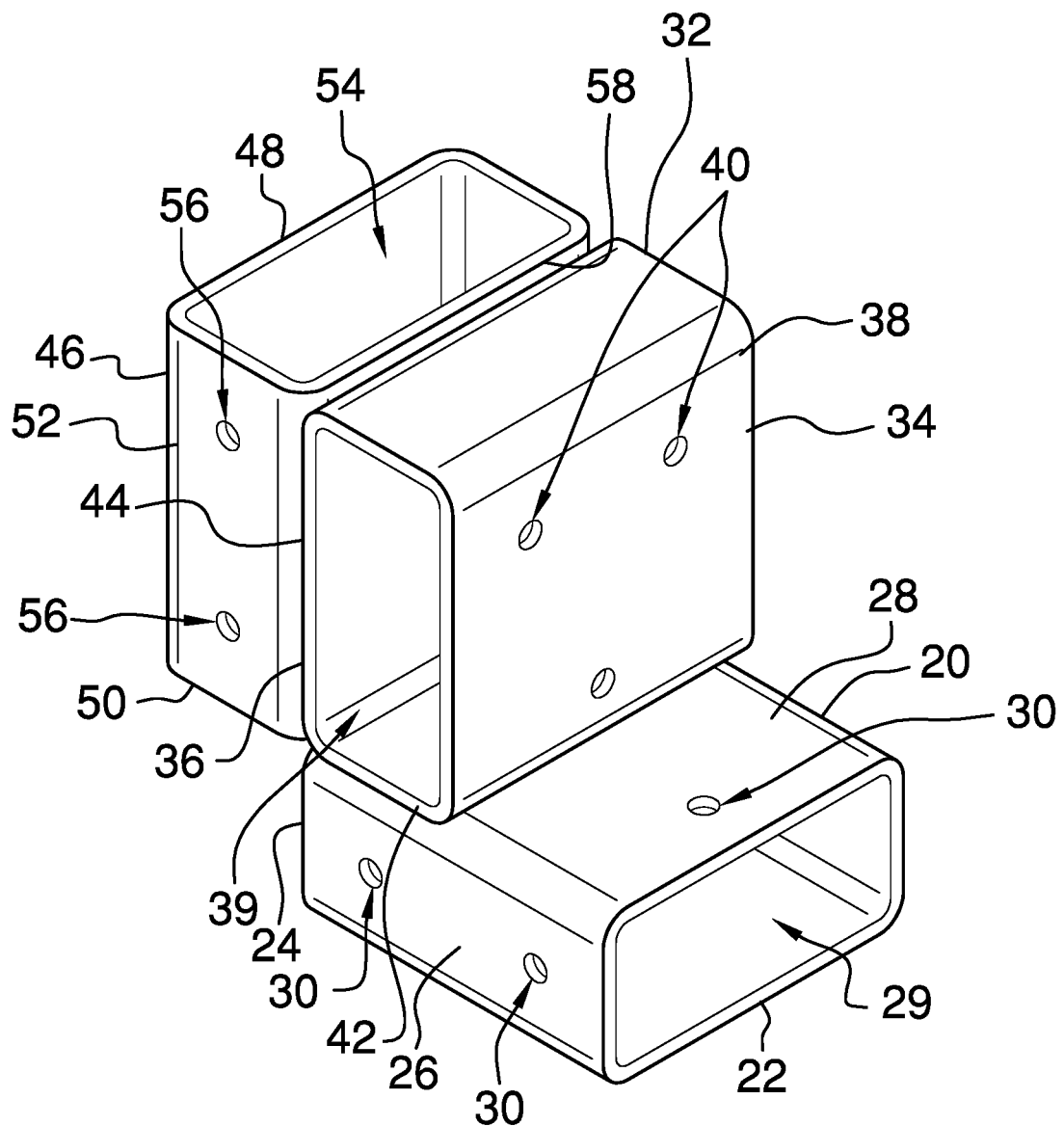
FIG. 1 is a perspective view of a bracket unit of a rack construction assembly according to an embodiment of the disclosure.
Figure 2:
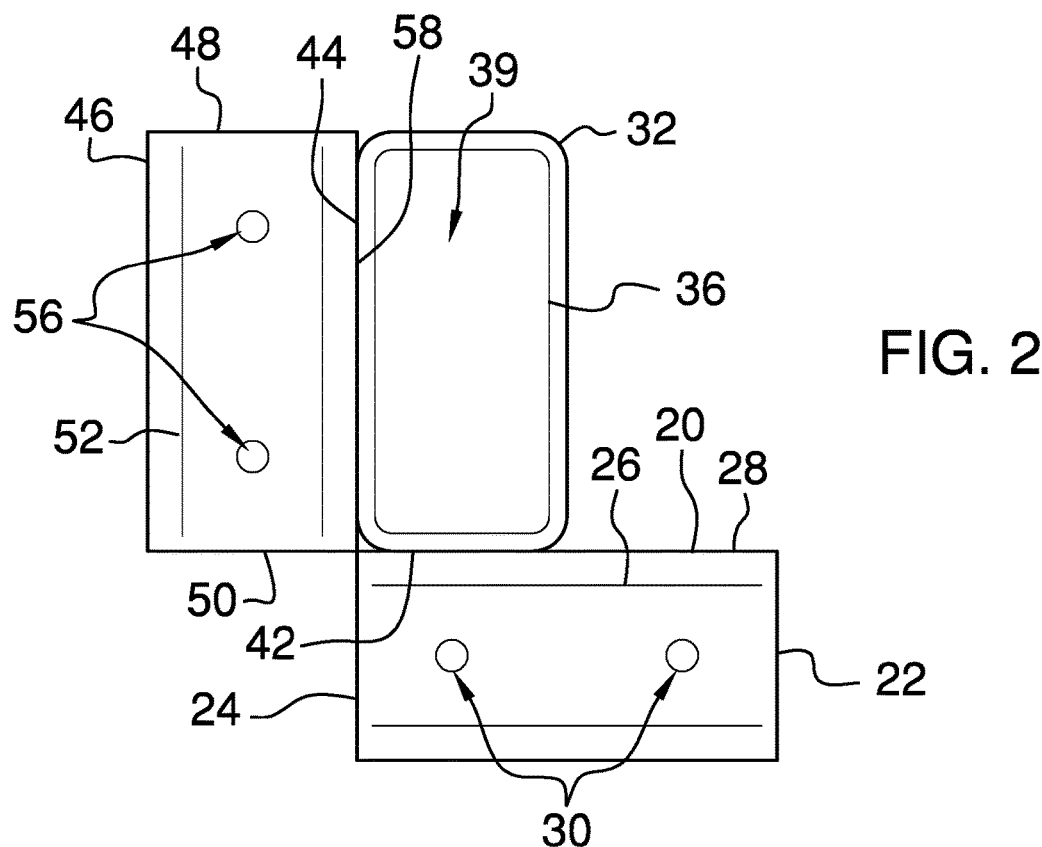
FIG. 2 is a right side view of a bracket unit of an embodiment of the disclosure.
Figure 3:
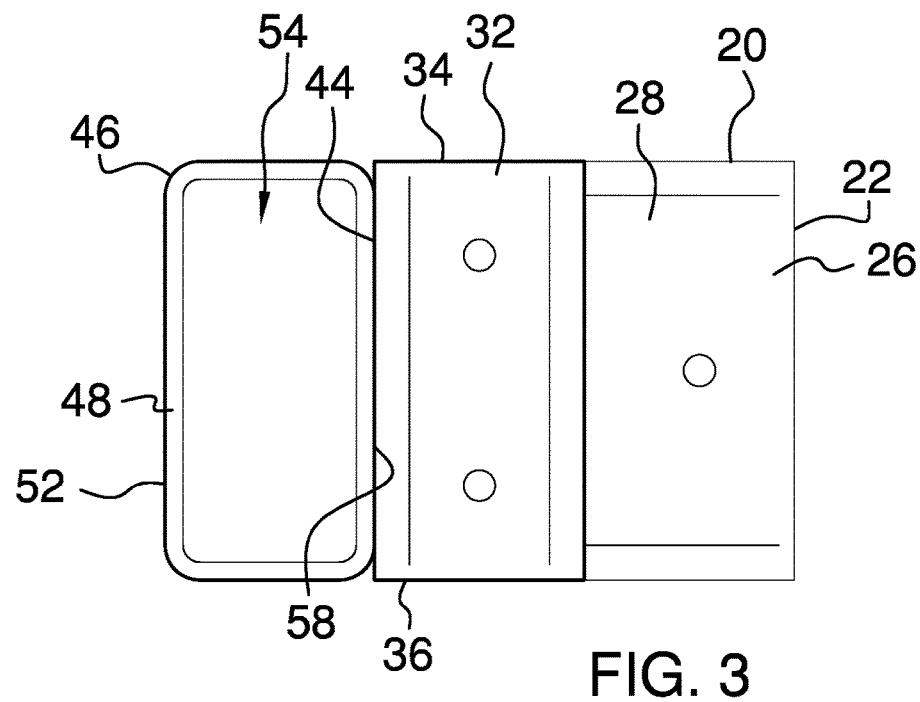
FIG. 3 is a top view of bracket unit of an embodiment of the disclosure.
Figure 4:
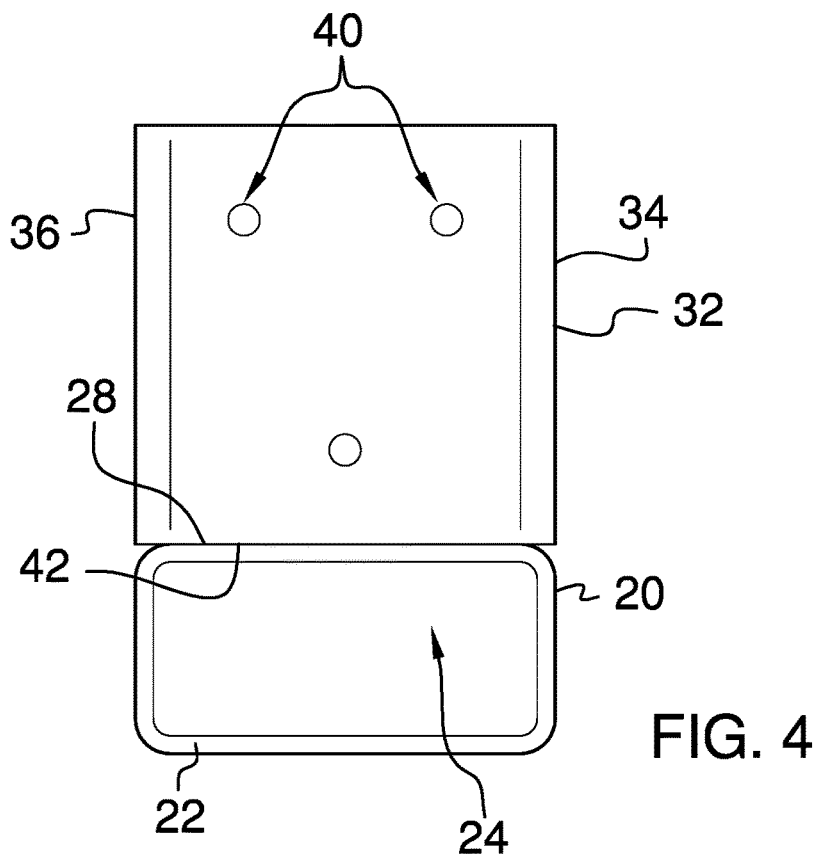
FIG. 4 is a front view of a bracket unit of an embodiment of the disclosure.
Figure 5:
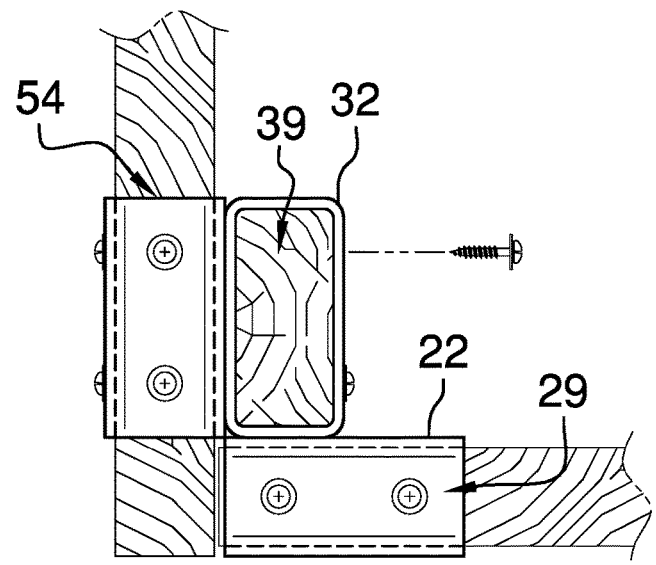
FIG. 5 is a perspective in-use view of an embodiment of the disclosure.
Figure 6:
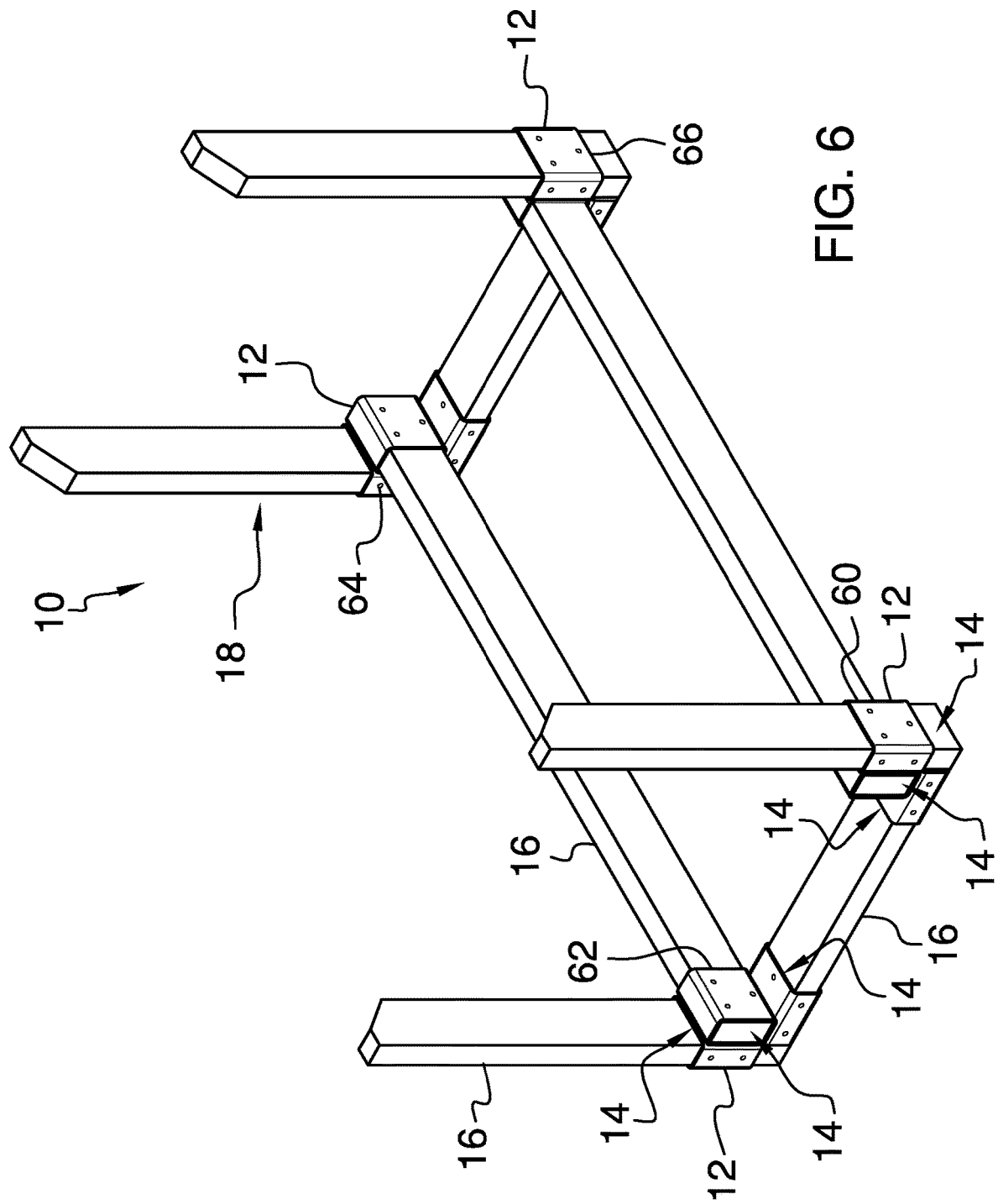
FIG. 6 is a top perspective in-use view of an embodiment of the disclosure.

With reference now to the drawings, and in particular to FIGS. 1 through 6 thereof, a new construction device embodying the principles and concepts of an embodiment of the disclosure and generally designated by the reference numeral 10 will be described.

As best illustrated in FIGS. 1 through 6, the rack construction assembly 10 generally comprises a plurality of bracket units 12. Each of the bracket units 12 has a plurality of channels 14 therein to insertably receive dimensional lumber 16. The dimensional lumber 16 may be a 2×4 or the like of a selected length and a selected species of wood. Each of the bracket units 12 is positioned to facilitating the dimensional lumber 16 to form a rack 18 for storing objects. Moreover, each of the channels 14 corresponding to each of the bracket units 12 is oriented at right angles with respect to each other. In this way the dimensional lumber 16 corresponding to each of the channels 14 defines an X axis, a Y axis and a Z axis of the rack 18.

Each of the bracket units 12 comprises a first sleeve 20 that has a first end 22, a second end 24 and an outer wall 26 extending therebetween. The outer wall 26 has a plurality of intersecting side such that the first sleeve 20 has a rectangular shape and the intersecting sides include a top side 28. Each of the first end 22 and the second end 24 is open to define a first channel 29 extending through the first sleeve 20. The outer wall 26 has a plurality of apertures 30 extending into an interior of the first sleeve 20 to insertably receive a fastener to engage the dimensional lumber 16. In this way the first sleeve 20 is fastened to the dimensional lumber 16.

Each of the bracket units 12 includes a second sleeve 32 that has a first end 34, a second end 36 and an outer wall 38 extending therebetween. Each of the first end 34 and the second end 36 of the second sleeve 32 is open to define a second channel 39 extending through the second sleeve 32. The outer wall 38 corresponding to the second sleeve 32 has a plurality of intersecting sides such that the second sleeve 32 has a rectangular shape. The outer wall 38 corresponding to the second sleeve 32 has a plurality of apertures 40 extending into an interior of the second sleeve 32 to insertably receive a fastener. In this way the second sleeve 32 is fastened the dimensional lumber 16.

The intersecting sides of the second sleeve 32 include a first lateral side 42 and a back side 44. The first lateral side 42 is coupled to the top side 28 of the first sleeve 20. Additionally, the second sleeve 32 is oriented such that an axis extending through the second channel 39 is oriented perpendicular to an axis extending through the first channel 29. Moreover, the back side 44 of the second sleeve 32 is aligned with the second end 24 of the first sleeve 20.

Each of the bracket units 12 includes a third sleeve 46 that has a first end 48, a second end 50 and an outer wall 52 extending therebetween. Each of the first end 48 and the second end 50 of the third sleeve 46 is open to define a third channel 54 extending through the third sleeve 46. The outer wall 52 corresponding to the third sleeve 46 has a plurality of intersecting sides such that the third sleeve 46 has a rectangular shape. Additionally, the outer wall 52 corresponding to the third sleeve 46 has a plurality of apertures 56 extending therethrough to insertably receive a fastener. In this way the third sleeve 46 is fastened to the dimensional lumber 16.

The outer wall 52 of the third sleeve 46 has a front side 58 and the front side 58 is attached to the back side 44 of the second sleeve 32. The third sleeve 46 is oriented such that an axis extending through the third channel 54 is oriented perpendicular to the axis extending through the second channel 39 and the axis extending through the first channel 29. The plurality of bracket units 12 includes a first bracket unit 60, a second bracket unit 62, a third bracket unit 64 and a fourth bracket unit 66.

In use, each of the first bracket unit 60, the second bracket unit 62, the third bracket unit 64 and the fourth bracket unit 66 is positioned to define an associated one of four corners of a rectangle. The bracket units 12 are arranged such that the first end of the first sleeve 20 corresponding to each of the first bracket unit 60 and the second bracket unit 62 face each other and the first end 22 of the first sleeve 20 corresponding to each of the third bracket unit 64 and the fourth bracket unit 66 faces each other. The first end 34 of the second sleeve 32 corresponding to the first bracket unit 60 faces the first end of the second sleeve 32 corresponding to the third bracket unit 64. Additionally, the first end 34 of the second sleeve 32 corresponding to the second bracket unit 62 faces the first end 34 of the second sleeve 32 corresponding to the fourth bracket unit 66. The first end 48 of the third sleeve 46 corresponding to each of the bracket units 12 is directed upwardly. The dimensional lumber 16 is positioned in the first 29, second 39 and third 54 channels to form the rack 18 for storing firewood and any other objects.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rack construction assembly for arranging a plurality of members into a rack for storing objects, said assembly comprising:
   a plurality of bracket units, each of said bracket units having a plurality of channels therein wherein each of said channels corresponding to each of said bracket units is configured to insertably receive dimensional lumber thereby facilitating the dimensional lumber to form a rack for storing objects, each of said channels corresponding to each of said bracket units being oriented at right angles with respect to each other wherein the dimensional lumber corresponding to each of said channels defines an X axis, a Y axis and a Z axis of the rack, each of said bracket units comprising
   a first sleeve having a first end, a second end and an outer wall extending therebetween, each of said first end and said second end being open to define a first channel extending through said first sleeve, said outer wall having a top side,
   a second sleeve having a first end, a second end and an outer wall extending therebetween, each of said first end and said second end of said second sleeve being open to define a second channel extending through said second sleeve, said outer wall of said second sleeve has a first lateral side and a back side,
   a third sleeve having a first end, a second end and an outer wall extending therebetween, each of said first end and said second end of said third sleeve being open to define a third channel extending through said third sleeve, said outer wall of said third sleeve having a front side, and
   wherein said outer wall of each of said first sleeve and said third sleeve has a respective pair of end faces, one of said end faces of said outer wall of said first sleeve being coplanar with an associated one of said end faces of said outer wall of said third sleeve and said first end of said second sleeve, a second one of said end faces of said first sleeve being coplanar with an associated second one of said end faces of said third sleeve and said second end of said second sleeve.

2. The assembly according to claim 1, wherein said outer wall has a plurality of apertures extending into an interior of said first sleeve wherein each of said apertures is configured to insertably receive a fastener to engage the dimensional lumber thereby fastening said first sleeve to the dimensional lumber.

3. The assembly according to claim 1, wherein said outer wall corresponding to said second sleeve having a plurality of apertures extending into an interior of said second sleeve wherein each of said apertures corresponding to said second sleeve is configured to insertably receive a fastener to engage the dimensional lumber thereby fastening said second sleeve to the dimensional lumber.

4. The assembly according to claim 1, wherein said first lateral side is coupled to said top side of said first sleeve, said second sleeve being oriented such that an axis extending through said second channel is oriented perpendicular to an axis extending through said first channel, said back side of said second sleeve being aligned with said second end of said first sleeve.

5. The assembly according to claim 1, wherein said outer wall corresponding to said third sleeve has a plurality of apertures extending I therethrough wherein each of said apertures corresponding to said third sleeve is configured to insertably receive a fastener to engage the dimensional lumber thereby attaching said third sleeve to the dimensional lumber.

6. The assembly according to claim 1, wherein said front side is attached to said back side of said second sleeve, said third sleeve being oriented such that an axis extending through said third channel is oriented perpendicular to an axis extending through said second channel and an axis extending through said first channel.

7. The assembly according to claim 6, wherein said plurality of bracket units includes a first bracket unit, a second bracket unit, a third bracket unit and a fourth bracket unit, each of said first bracket unit, said second bracket unit, said third bracket unit and said fourth bracket unit being positioned to define an associated one of four corners of a rectangle.

8. The assembly according to claim 7, wherein said first end of said first sleeve corresponding to each of said first bracket unit and said second bracket unit facing each other.

9. The assembly according to claim 7, wherein said first end of said first sleeve corresponding to each of said third bracket unit and said fourth bracket unit faces each other.

10. The assembly according to claim 7, wherein said first end of said second sleeve corresponding to said first bracket unit faces said first end of said second sleeve corresponding to said third bracket unit.

11. The assembly according to claim 7, wherein said first end of said second sleeve corresponding to said second bracket unit faces said first end of said second sleeve corresponding to said fourth bracket unit.

12. The assembly according to claim 7, wherein said first end of said third sleeve corresponding to each of said bracket units is directed upwardly.

13. A rack construction assembly for arranging a plurality of members into a rack for storing objects, said assembly comprising:
  a plurality of bracket units, each of said bracket units having a plurality of channels therein wherein each of said channels corresponding to each of said bracket units is configured to insertably receive dimensional lumber thereby facilitating the dimensional lumber to form a rack for storing objects, each of said channels corresponding to each of said bracket units being oriented at right angles with respect to each other wherein the dimensional lumber corresponding to each of said channels defines an X axis, a Y axis and a Z axis of the rack, each of said bracket units comprising:
    a first sleeve having a first end, a second end and an outer wall extending therebetween, each of said first end and said second end being open to define a first channel extending through said first sleeve, said outer wall having a plurality of apertures extending into an interior of said first sleeve wherein each of said apertures is configured to insertably receive a fastener to engage the dimensional lumber thereby fastening said first sleeve to the dimensional lumber, said outer wall having a top side,
    a second sleeve having a first end, a second end and an outer wall extending therebetween, each of said first end and said second end of said second sleeve being open to define a second channel extending through said second sleeve, said outer wall corresponding to said second sleeve having a plurality of apertures extending into an interior of said second sleeve wherein each of said apertures corresponding to said second sleeve is configured to insertably receive a fastener to engage the dimensional lumber thereby fastening said second sleeve to the dimensional lumber, said outer wall of said second sleeve having a first lateral side and a back side, said first lateral side being coupled to said top side of said first sleeve, said second sleeve being oriented such that an axis extending through said second channel is oriented perpendicular to an axis extending through said first channel, said back side of said second sleeve being aligned with said second end of said first sleeve,
  a third sleeve having a first end, a second end and an outer wall extending therebetween, each of said first end and said second end of said third sleeve being open to define a third channel extending through said third sleeve, said outer wall corresponding to said third sleeve having a plurality of apertures extending therethrough
  wherein each of said apertures corresponding to said third sleeve is configured to insertably receive a fastener to engage the dimensional lumber thereby attaching said third sleeve to the dimensional lumber, said outer wall of said third sleeve having a front side, said front side being attached to said back side of said second sleeve, said third sleeve being oriented such that an axis extending through said third channel is oriented perpendicular to the axis extending through said second channel and the axis extending through said first channel,
  wherein said outer wall of each of said first sleeve and said third sleeve has a respective pair of end faces, one of said end faces of said outer wall of said first sleeve being coplanar with an associated one of said end faces of said outer wall of said third sleeve and said first end of said second sleeve, a second one of said end faces of said first sleeve being coplanar with an associated second one of said end faces of said third sleeve and said second end of said second sleeve, and
  said plurality of bracket units including a first bracket unit, a second bracket unit, a third bracket unit and a fourth bracket unit, each of said first bracket unit, said second bracket unit, said third bracket unit and said fourth bracket unit being positioned to define an associated one of four corners of a rectangle, said first end of said first sleeve corresponding to each of said first bracket unit and said second bracket unit facing each other, said first end of said first sleeve corresponding to each of said third bracket unit and said fourth bracket unit facing each other, said first end of said second sleeve corresponding to said first bracket unit facing said first end of said second sleeve corresponding to said third bracket unit, said first end of said second sleeve corresponding to said second bracket unit facing said first end of said second sleeve corresponding to said fourth bracket unit, said first end of said third sleeve corresponding to each of said bracket units being directed upwardly.

* * * * *